Figure 1:
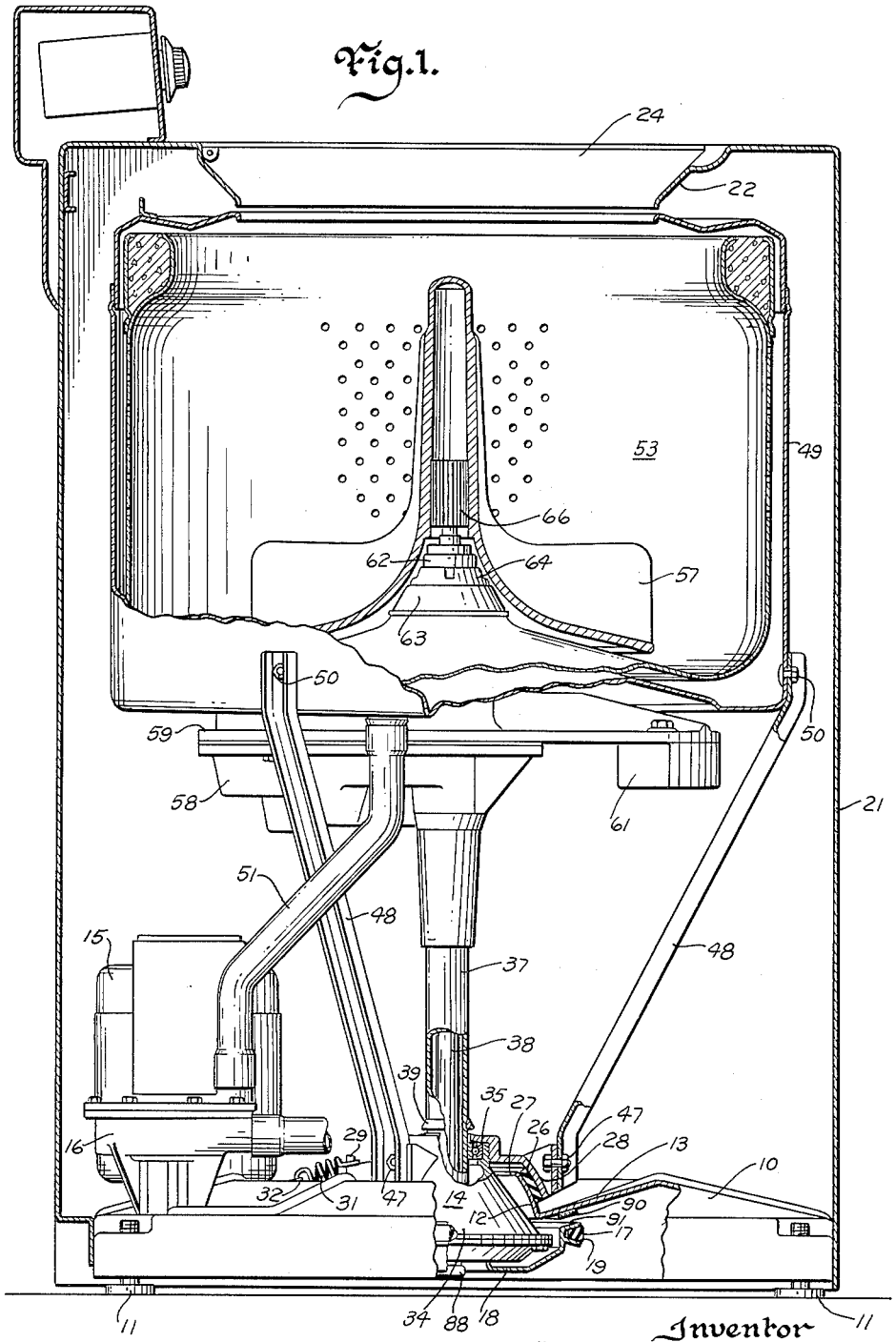

Aug. 14, 1962          J. W. LANNERT          3,049,025

ENERGY ABSORPTION STOP

Filed May 4, 1959                                      2 Sheets—Sheet 1

Inventor
James W. Lannert
by William G. Landwier
Agent

Aug. 14, 1962  J. W. LANNERT  3,049,025
ENERGY ABSORPTION STOP
Filed May 4, 1959  2 Sheets-Sheet 2

Inventor
James W. Lannert
by William G. Landwier
Agent

United States Patent Office 3,049,025
Patented Aug. 14, 1962

3,049,025
ENERGY ABSORPTION STOP
James W. Lannert, St. Joseph, Mich., assignor to The Maytag Company, Newton, Iowa, a corporation of Delaware
Filed May 4, 1959, Ser. No. 810,850
6 Claims. (Cl. 74—574)

This invention relates to an energy absorption device, and more particularly to dampening mechanisms for gyrating extractors, such as employed in clothes washing machines.

In certain clothes washing machines, the clothes are washed in a tub by a suitable agitator. Upon completion of the washing cycle, the liquid is centrifugally extracted from the clothes by spinning a basket. In machines employing centrifugal extractors, the washer and extractor assembly is mounted for tilting, gyrating motion about a pivotal support. Since the wet clothes are almost never exactly distributed evenly about the spin axis, the centrifuging operation is subject to vibrations through the eccentricity of the load. This problem is well recognized in this field and many attempts have been made to suppress, or eliminate, the vibrations. Various systems have been employed for centering the assembly and dampening, or reducing, the vibrations, or gyrations, thereof. In some systems switches are actuated if vibrations exceed a certain magnitude to reduce the speed of the extractor, or stop it entirely. Also, various friction dampening systems are used to reduce the vibrations, or gyrations.

If the power drive for the extractor is shut off entirely during unbalanced conditions, the centrifuging operation is reduced, if not completely stopped. Stopping the extractor is undesirable, since the unbalance is due, in part, to the water contained in the unevenly distributed clothes. If the water is continued to be eliminated from the load during extreme vibrations, it is possible that upon continued rotation enough water will be extracted to reduce the unbalanced condition, and to allow higher rotational speeds.

It is desirable to absorb some of the energy contained in the violent oscillations due to unbalanced loads. This reduces the violence of the vibrations.

Figure 2:
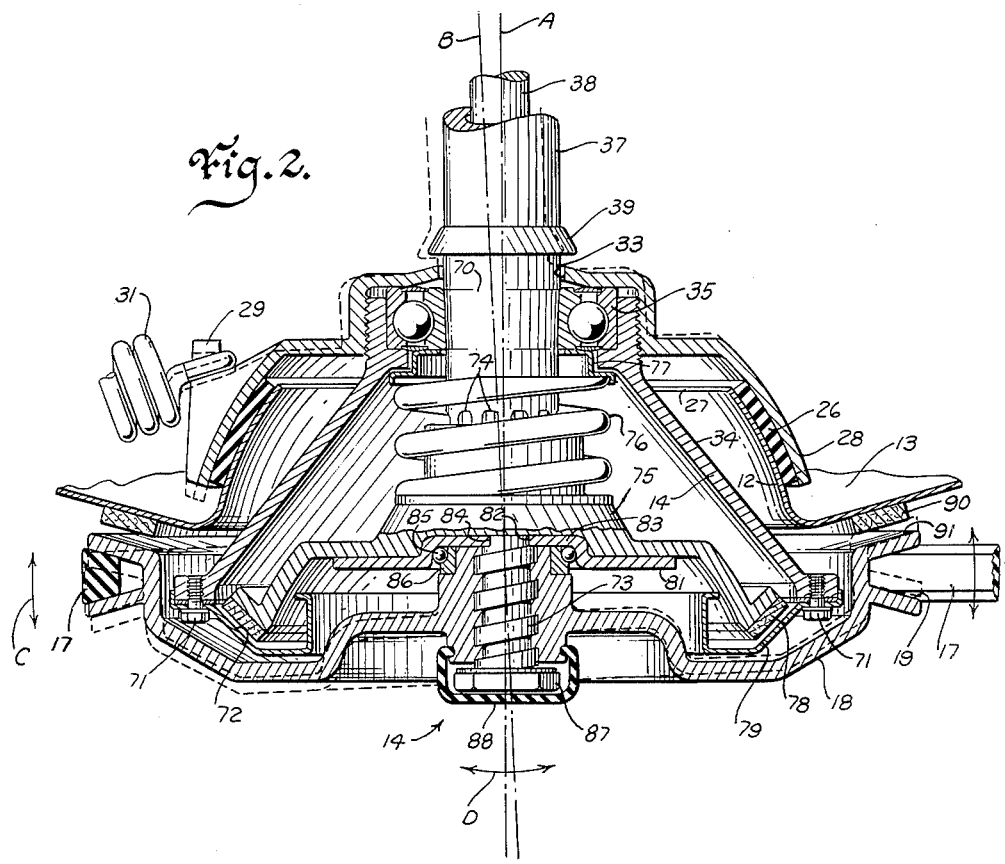

It is, therefore, an object of the invention to provide a device for reducing the vibrations of a washing machine during the extraction, or centrifuging, operations. It is a further object of the invention to dampen the vibrations due to unbalanced conditions in the centrifuging operation. It is a still further object of the invention to absorb the energy in the gyrations produced by the uneven distribution of the load in an extractor. It is another object of the invention to provide a system for reducing the speed of the extractor during the centrifuging operation without completely stopping the rotation. It is still another object of the invention to provide a dampening mechanism which is simple and inexpensive to manufacture. Further objects, advantages and features of the invention will be more apparent as the description proceeds from a study of the following specification and attached drawings, in which:

FIGURE 1 is a side elevation partly broken away, showing the machine of the vertical axis type, embodying the energy absorption device of the present invention; and FIGURE 2 is an enlarged fragmentary view partly in vertical section of the drive assembly shown in FIGURE 1, illustrating the energy absorption device of the invention. The dotted lines of FIGURE 2 illustrate the movement of various parts under the conditions of an unbalanced load.

Referring to FIGURE 1 of the drawings, there is illustrated a washing machine with a centrifugal extractor. A supporting member or base frame 10 is mounted on adjustable feet 11. Supporting dome 12 rises out of a centrally located depression 13 in base frame 10. A drive assembly 14, of the type disclosed in the application of John D. Goodlaxon, Serial No. 505,231, filed May 2, 1955, assigned to the same assignee as that of the instant application, now further identified as U.S. Patent No. 2,948,372 issued August 9, 1960, is mounted on dome 12.

A reversible motor 15 and the water pump 16 are mounted on base frame member 10. The water pump 16, and drive assembly 14, are driven by motor 15 through belt 17 on the under side of base frame 10. Numeral 19 designates the groove of pulley 18 which serves as the input member for the drive assembly 14.

Cabinet 21, attached to and enclosing base frame 10 together with the drive and tub assemblies supported thereby, is provided at its upper end with a depending annular flange 22 defining an access opening into the washing machine apparatus, normally covered by access door 24.

Dome 12 in base frame 10 has friction pads 26 at its periphery adjacent the opening 27 in its uppermost portion. An umbrella-like support member 28 rests on these friction pads 26. Support member 28 has three equally spaced ears 29 for three centering springs 31 (only one of the ears and springs is shown in FIGURE 1) which are fastened to brackets 32 connected to base frame 10. This arrangement centers support member 28 on dome 12 and restrains it from rotation relative to base frame 10.

Threaded into the umbrella support member 28 is a stator support member 34 of substantially frusto-conical configuration which serves as a housing for drive assembly 14, more particularly described in the previously identified Goodlaxon application, Serial No. 505,231. Stator support or housing member 34 cooperates with umbrella support member 28 by gripping the outer race of a thrust bearing 35 which is provided with a tapered inner race. Mating with and seated in this tapered inner race of bearing 35 is the spin tube, or shaft 37, which journals a power shaft 38, also extending into the drive assembly 14. With this construction all weight placed on the spin tube 37, member 34, and umbrella member 28 may be used to an advantage to provide ample frictional forces between umbrella member 28 and the friction pads 26 for dampening nutational movements of the shafts 37 and 38 relative to dome 12 while permitting rotational movement of spin tube 37 in thrust bearing 35.

Umbrella support member 28 is provided with three recessed upstanding lugs 46 spaced equally from each other and alternately around member 28 with respect to the three ears 29. While not entirely obvious from FIGURE 1, it will be apparent from this description that there are three lugs 46 spaced 120° from each other, each of which is 60° removed from an adjacent ear 29.

Fastened within the recessed lugs 46 by connectors 47 are the three tub brace members 48 which are, in this embodiment, of channel-like cross section. Brace members 48 extend outwardly and upwardly from umbrella support member 28 to join the non-rotatable imperforate outer tub 49 through tub connectors 50 to form an inverted tripod support for tub 49. The tub 49 is provided with a bottom wall in which is formed a gutter having its lowermost portion converging into the drain outlet connected to the water pump 16 through the flexible drain hose 51.

Mounted within tub 49 is a clothes basket, or receptacle, 53 which carries at its uppermost end an inertia ring. A conventional oscillating type agitator 57 is mounted within the receptacle 53 to provide agitation of fabrics placed therein.

The following connections to drive assembly 14 are provided in order to oscillate agitator 57 during the agitation cycles and to rotate receptacle 53 during the centrifugal extraction operations. Spin tube 37, which extends into drive assembly 14, carries at its uppermost end the lower gear case cover 58 which in turn is bolted to the upper gear case cover 59 carrying the counterweight 61. The upper cover 59 is provided with a tubular extension 62 which passes through a tub bearing assembly (not shown) in the bottom wall of the outer tub 49. That bearing assembly permits extension 62 to rotate relative to tub 49 while maintaining a water-tight seal in the bottom wall to prevent any leakage of washing fluid from tub 49.

Extension 62 is provided with a shouldered portion (not shown) beneath inner tub 53 mating with and supporting the central area of the bottom wall through which extension 62 protrudes. A tub clamp washer 63 slides onto the extension 62 within receptacle 53 and is clamped against the upper surface of the frusto-conical central portion of that receptacle by a large clamp nut 64 threaded onto extension 62. With this construction receptacle 53 becomes a unitary assembly with spin tube 37 and moves in accordance with the rotational movements imparted to that latter member by drive assembly 14. Similarly, movements imparted to receptacle 53 due to the presence of unbalanced clothes loads within that receptacle are transmitted to extension 62, spin tube 37, tub 49 and the resiliently mounted umbrella support member 28.

Agitator 57 which is splined to the upper end of the agitator shaft 66 journalled within the tubular extension 62 receives its oscillatory movements from a conventional motion converting unit housed between gear case covers 58 and 59 and driven by the revoluble power shaft 38.

Referring now to the details of the drive assembly 14 as shown in FIGURE 2, it can be seen that both shafts 37 and 38 pass freely through opening 33 at the top of umbrella member 28 and terminate below base member 10. Deflector seal 39 fitted around tube 37 prevents oil, water, etc., which may possibly drain down tube 37 from working into the parts of the drive assembly and impairing its operation.

While the connections of shaft 38 within gear case covers 58, 59 (FIGURE 1) prevent axial movements of this shaft relative to its concentric tube 37, tube 37 is maintained in its vertical position solely by means of its support on umbrella member 28. With this construction the weight of the tub assembly so supported may be used to an advantage to provide an ample frictional force between umbrella member 28 and friction pads 26 for dampening gyratory shaft movements. To accomplish this end, shaft 37 is provided with a tapered portion 70 seated in the mating tapered inner race of thrust bearing 35. The outer race of bearing 35 is gripped between umbrella member 28 and stator support member 34 by means of right hand threads holding these two latter members together in an integral unit.

The lower end of tube 37 is provided with splines 74 which fit into rotor member 75 and allow the latter member to move relative to shaft 37 in an axial direction only. Rotor 75 is urged downwardly by a large coil spring 76 encircling shaft 37 and abutting rotor 75 and a spring retainer member 77 which in turn presses upwardly against the inner race of thrust bearing 35.

Spring 76 moves rotor 75 downwardly until brake lining 78, cemented to the bevelled edge of rotor 75, engages brake stator 79 which is fastened to stator support member 34 by means of cap screw 71 threaded into the latter member. Use of these mating bevelled rotor and stator parts produces a higher unit loading on lining 78 for a given size spring than would be achieved through the positioning of these same parts in a horizontal plane. Stator 79 presents a stationary brake surface 72 to rotor 75 and serves as a reservoir for a small quantity of lubricating fluid in case it is desired to use a lubricated rather than a dry brake lining.

The power shaft 38 extending beyond the lower end of shaft 37 is provided with a helix 73.

A clutch member 81, which has a D-shaped opening 82 in its raised central portion 83 slides over helix 73 and, when moved laterally of shaft 38 and centered with respect to that shaft, is free to move axially of that shaft while being restrained against rotation relative to that shaft by a flat portion 84.

Pulley 18 which is powered through V-belt 17 by means of the reversible motor 15, is threaded on helix 73 to permit its vertical travel on shaft 38 as determined by the direction of rotational movements imparted to it by motor 15.

It should be noted that while shaft 37 and its inner shaft 38 are supported by dome member 12, these concentric shafts actually pivot on a point determined by the intersection of the radii of curvature of this dome. This point is also the intersection of the shafts' axis of rotation with the horizontal plane bisecting the V-groove 19 to minimize changes in belt tension during the gyratory movements of the shafts.

The central portion 83 of clutch member 81 serves as the outer race for balls 85 which permit relative rotary movement between clutch member 81 and pulley 18 while a hardened insert 86 fitted on the hub of pulley 18 provides the inner race for these balls.

Pulley 18 is prevented from turning itself off the bottom of shaft 38 by a left hand cap screw 87 threaded into the lower end of shaft 38. With this construction a spiral movement of pulley 18 downwardly against cap screw 87 tends to tighten screw 87 into shaft 38. Resilient seal 88 provides a means for keeping foreign matter out of the helix 73 and the space between the abutting surfaces of pulley 18 and screw 87.

In operation, when no power is supplied to the drive assembly described, the parts assume the position in which outer shaft 37 is held in a braked position as rotor 75, splined to shaft 38, is urged against stator 79 by the large coil spring 76. Since stator 79 is in effect an integral part of umbrella member 28 which cannot rotate due to the anchoring action of centering springs 31, shaft 37 may only nutate on friction pads 26 of dome member 12.

During the agitation period when motor 15 rotates pulley 18 in a counterclockwise direction as viewed from the bottom of the drive assembly, the pulley 18 screws downwardly on shaft 38 until it abuts cap screw 87. Further rotation of pulley 18 imparts the same direction of rotary movement to shaft 38 which oscillates agitator 57 through the motion converting mechanism housed within casings 58, 59. Basket, or receptacle 53, which is connected to shaft 37 through casings 58, 59 is restrained against rotary or oscillatory movement because of the continuing braking engagement maintained between rotor 75 and stator 79.

During the fluid extraction period when motor 15 is reversed and pulley 18 is rotated in a clockwise direction as viewed from the bottom of the assembly, pulley 18 rotates clockwise relative to shaft 38 and climbs helix 73. It should be noted at this point that relative rotation between pulley 18 and shaft 38 is possible because of the inertia offered by the agitator mechanism connected to shaft 38.

While clutch member 81 remains in a centered position at all times because of the centering action of balls 85 and inner race 86 which support it, member 81 does not contact rotor 75 when no power is supplied to motor 15 or when pulley 18 is seated against cap screw 87. However, during the fluid extraction period when pulley 18 is screwed upwardly on helix 73, clutch member 81 slides axially on flat 84 as pulley 18 moves balls 85 upwardly against central portion 83, as shown in FIGURE 2. This causes the clutch member 81 to engage and lift rotor member 75 away from stator 79 against the action of compression spring 76.

While pulley 18 rotates relative to shaft 38 when climbing helix 73, no rotary movement is initially imparted to member 81 on shaft 38. However, when member 81 is prevented from traveling upwardly because of its abutting the longer end of shaft 37, pulley 18 attempts to wedge itself in helix 73 and against balls 85. This not only drives shaft 38 but also creates a power path from pulley 18 through flat 84 and clutch member 81. Further rotation of pulley 18 in a clockwise direction causes clutch member 81 to rotate rotor 75 through the frictional coupling between these latter two members. This turns outer shaft 37 in unison with the inner shaft 38 to spin the basket 53 and agitator 57 during the centrifuging operation.

From this operational description it will be seen that upon rotation of pulley 18 by motor 15 in a counterclockwise direction as viewed from the bottom of FIGURE 1, spin shaft 37 will be braked, while pulley shaft 38 will cause an oscillation of agitator 57. Upon reversal of motor 15, pulley 18 will drive shafts 37 and 38 in unison in a reversed direction to spin receptacle 53 in order to effect a fluid extraction of fabrics retained within that receptacle. Water pump 16 which is driven by the same belt 17 as is pulley 18 is a two-way centrifugal pump which pumps toward tub 49 during agitation periods and pumps fluid away from that tub to an external drain during the fluid extraction periods.

Since receptacle 53 is ordinarily loaded at random with various types and weights of garments, it is not unusual to achieve an unbalanced loading within that clothes receptacle. Upon rotation by spin tube 37 under such conditions certain unbalanced centrifugal forces are produced within receptacle 53. This causes the receptacle 53 to deviate from its normal vertical position, as indicated by line A, to the dotted line position B shown in FIGURE 2 in response to these forces and to rotate about an axis which nutates about that normal axis, as indicated by arrows C and D in FIGURE 2, and which defines the nutational movements of tub member 49 and its supporting structure relative to base frame 10.

While the resilient mounting which supports tub 49 and receptacle 53 and dampens the nutational movements about the vertical axis partially isolates these disturbing unbalanced forces from base frame 10 and the surface supporting that base frame, the lateral deviations of the entire tub assembly from the vertical axis may, under certain possible unbalanced clothes load conditions, be of such magnitude as to produce a violent contact between tub 49 and cabinet 21 as well as resulting in such servere vibrations as to damage the machine and consume an unnecessary amount of power.

As receptacle 53 is rotated through its range of speeds to a full speed in excess of 500 or 600 r.p.m., it passes through a critical speed having a rotational period equal to and resonant with the natural period of oscillation of the resilient mounting system supporting the entire tub assembly. It is, therefore, necessary for receptacle 53 to pass quickly through that critical speed without allowing the power supplied to spin tube 37 to be expended needlessly in the reinforcement of the resonant vibrations of the tub assembly, in which case the lateral deviations might become uncontrollable. In any event power is wasted unnecessarily under unbalanced conditions of receptacle 53.

In the present invention friction pads 90 are mounted to the lower surface of the base frame 10 adjacent an upwardly projecting radial face portion 91 of pulley 18. The friction pads 90 have a lower radial face spaced from the radial face 91 of the pulley 18 to be engaged thereby only during conditions of unbalance when the tub assembly deviates from its vertical axis and causes the drive assembly 14, to be displaced, such as shown by the dotted lines in FIGURE 2.

When the tub assembly oscillates about the pivot point determined by the radii of curvature of the umbrella member 28, the radial face 91 of the drive pulley engages the radial face of the friction pads 90. Through this engagement some of the energy of the rotating system is dissipated. This reduces the tendency of the system to reinforce the vibrations caused by unbalance. Also, the absorption of energy due to the frictional engagement of the friction pads 90 with the radial face 91 of the pulley 18 causes the rotation to slow down; however, without completely stopping the rotation. During the period in which the machine has reduced its rotational speed, the pump 16 will continue to remove water from the tub 49, thus improving the unbalanced conditions which are caused, in part, by the presence of the water in the wet fabrics.

The absorption of energy by the friction pads has a distinct advantage over the use of safety switches by which the machine is shut off. The friction pads absorb sufficient energy to reduce the speed of rotation of the tub assembly during excessive unbalanced conditions. However, the spinning operation is continued at reduced speeds so that the centrifugal extraction operation is maintained. Through the continued removal of water, the chances are good that the unbalanced condition will be reduced sufficiently to permit higher rotational speeds.

The engagement of the friction pads 90 by the radial face 91 of the pulley 18 has another advantage, resulting from the particular cooperation of the parts used in the clutch disclosed herein. Engagement action of pads 90 with face 91 causes relative rotation between the pulley 18 and the helix 73, so that the pulley, in effect, is turned in a counterclockwise direction relative to the helix 73. This uncouples the pulley 18 from the drive assembly, reducing the input of power thereto from the motor 15. Uncoupling of pulley 18 from the drive assembly reduces the tendency to reinforce the vibrations through the power input. It also has the advantage of isolating the unbalanced forces from the pulley 18.

In the drawings and specification there have been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit, or scope, of this invention as further defined in the following claims.

For example, it should be noted that the friction pads may be omitted, and the lower surface of frame 10 may act as a friction face provided it is spaced to be engaged by face 91 during conditions of unbalance, and provided the coefficient of friction between the two engaging friction faces is sufficient to absorb energy. Obviously, friction pads may be mounted on the pulley 18, to engage frame 10 during unbalance conditions, rather than on the frame, as shown. Also, it may be desirable to mount the rotating friction face on a rotating element other than pulley 18, for instance, a separate rotating annulus connected to shaft 38 may be used to engage a stationary face connected to frame 10. Other changes and substitutions embodying the principles of the disclosed invention will be apparent to persons in this field.

I claim:

1. In a washing machine, a supporting member, a receptacle, a rotatable shaft connected to said receptacle for rotation thereof, said shaft mounted on said supporting member for nutational movements caused by unbalance conditions in said receptacle, a rotatable friction face member on said shaft for rotation therewith, and a stationary friction face member on said supporting member for frictional engagement with said rotatable friction face member during conditions of unbalance.

2. In a washing machine, a frame, a mounting surface on said frame of a partial spheroidal configuration, a support member mating with and supported by said spheroidal surface, a rotatable shaft mounted on said support member, a receptacle connected to said shaft, a resilient system interconnecting said frame and said support member tending to maintain said shaft in an upstanding position, a friction face member fastened to said shaft for rotation therewith, and a stationary friction face member on said frame for frictional engagement with said rotary friction face member during conditions of unbalance.

3. In a washing machine, a frame, a rotatable shaft, a receptacle connected to said shaft for rotation therewith, said shaft mounted on said frame for nutational movements with respect thereto caused by unbalance in said receptacle, a resilient system tending to maintain said shaft in an upstanding position, a friction face member attached to said shaft for rotation therewith, and a stationary friction face connected to said frame at a distance spaced from said rotary friction face when said shaft is maintained in an upstanding position and for frictional engagement with said rotary friction face during conditions of unbalance in said receptacle.

4. In a washing machine, a frame, a semi-spheroidal mounting surface on said frame, a support member mating with and supported by said semi-spheroidal surface, a rotatable shaft mounted on said support member, a pulley secured to said shaft below said support member, a receptacle connected to said shaft for rotation therewith, drive means for rotating said pulley, a resilient system tending to maintain said shaft in an upstanding position, a friction face on said pulley for rotation therewith, and a stationary friction face connected to said frame spaced from said rotary friction face when said shaft is maintained in an upstanding position and for frictional engagement with said rotary friction face during conditions of unbalance in said receptacle.

5. In a washing machine, a frame, a semi-spheroidal mounting surface on said frame, a support member mating with and supported by said semi-spheroidal surface, a rotatable shaft mounted on said support member, a receptacle connected to said shaft for rotation therewith, a resilient system tending to maintain said shaft in an upstanding position, a friction face member secured to said shaft for rotation therewith, and a stationary friction face connected to said frame at a distance spaced from said rotary friction face so as not to be contacted thereby when said shaft is maintained in an upstanding position and for frictional engagement with said rotary friction face during conditions of unbalance in said receptacle.

6. In a washing machine, a base member, a semi-spheroidal mounting surface on said base member, a support member mating with and supported by said semi-spheroidal surface, a rotatable shaft journalled in said support member, a pulley secured to said shaft below said base member, a receptacle connected to said shaft for rotation therewith, said shaft mounted on said support member for nutational movements with respect to said base member caused by unbalance in said receptacle, a resilient system tending to maintain said shaft in an upstanding position, a rotary friction member including a radial friction face mounted on said revoluble pulley in fixed relationship thereto, and a stationary friction face member mounted below said base member for frictional engagement with said rotary friction face during conditions of unbalance in said receptacle.

References Cited in the file of this patent

UNITED STATES PATENTS

| | | |
|---|---|---|
| 2,346,668 | Dunham | Apr. 18, 1944 |
| 2,406,187 | Bayless | Aug. 20, 1946 |
| 2,572,265 | Johnson | Oct. 23, 1951 |
| 2,775,883 | Burris | Jan. 1, 1957 |
| 2,836,993 | Johnson et al. | June 3, 1958 |
| 2,901,294 | Smith | Aug. 25, 1959 |
| 2,948,372 | Goodlaxson | Aug. 9, 1960 |

FOREIGN PATENTS

| | | |
|---|---|---|
| 142,244 | Australia | July 16, 1951 |
| 837,091 | Germany | Apr. 21, 1952 |
| 1,023,063 | France | Dec. 24, 1952 |